D. J. Powers.

Straw Cutter.

No. 3,898. Reissued Mar. 29, 1870.

Witnesses:
Wm. H. Browne
M. H. Butt

Inventor:
James Palmer
by his attorney in fact
Geo. S. Palmer

N. PETERS, PHOTO-LITHOGRAPHER, WASHINGTON, D. C.

United States Patent Office.

JAMES PALMER, OF BROOKLYN, NEW YORK, ASSIGNEE, BY MESNE ASSIGNMENTS, OF D. J. POWERS.

*Letters Patent No.* 27,154, *dated February* 14, 1860; *reissue No.* 3,898, *dated March* 29, 1870.

IMPROVEMENT IN STRAW-CUTTERS.

The Schedule referred to in these Letters Patent and making part of the same

Be it known that DAVID J. POWERS, of Madison, in the county of Dane and State of Wisconsin, did invent certain Improvements in Straw and Hay-Cutting Machines, of which the following is a specification.

The nature of the invention herein claimed relates to the combinations and arrangements of the operating parts of a machine for cutting fodder, such as hay, straw, cornstalks, &c., for cattle and horses, especially among parts of which is the combination of the gearing of the feeding-rollers, which allows of the movable feeding-roller to adjust to the thickness of the material fed to the cutting-knives. Also, the combination of the independently-operating pinions on the driving-shaft with the gear-wheels which operate the feeding-rollers, and its substitute, a sliding or shifting gearing, having two sets of cogs, (which is shown in a separate figure,) whereby the fodder may be cut of different lengths, as will be hereinafter specified, and, with the other parts of the machine, will be fully described.

In the accompanying drawings—

Figure 2:
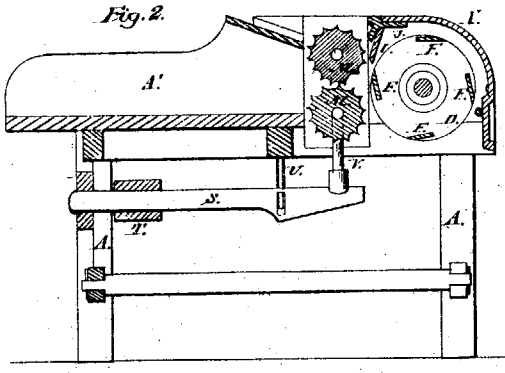
Figure 3:
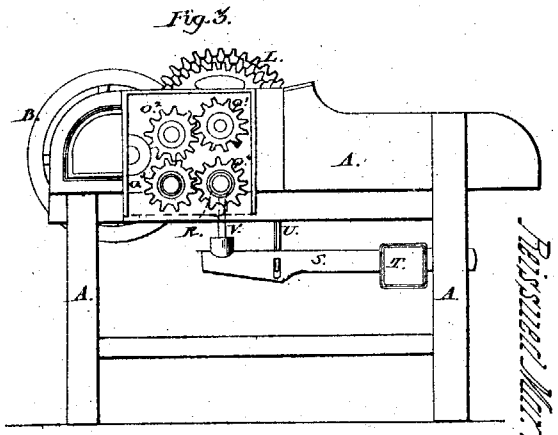
Figure 1:
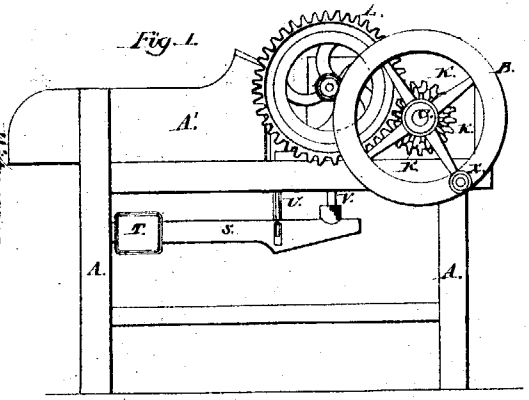
Figure 4:
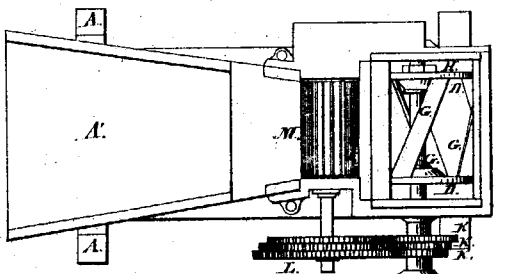
Figure 5:
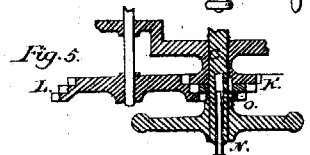

Figure 1 is a vertical side view of the machine;

Figure 2, a vertical longitudinal section;

Figure 3, a side view of the side opposite fig. 1;

Figure 4, a plan or top view;

Figure 5, a horizontal sectional view of the hand-wheel and feeding-gear; and

Figure 6:
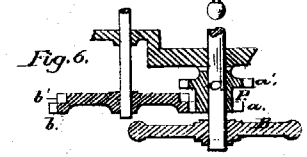

Figure 6, a similar view of the hand-wheel and a slipping-gearing, which may be used in place of the gearing, fig. 5, for the purpose of altering the length of the cut fodder.

Like letters in the different figures indicate like parts.

A′ represents the box, and A the frame of the machine.

B is the driving-wheel upon the shaft C. Upon this shaft are placed two circular metallic plates, D, securely fastened, so as not to turn except with the shaft. One of these plates is movable laterally upon the shaft C.

Upon the inside of each of these plates, near the circumference, are four mortises, F, for the purpose of holding the cutting-knives.

G G are the cutting-knives, the ends of which are placed in the mortises F, and then, by means of a nut and screw, H, upon the shaft C, the circular plates D are pressed against the end of the knives, which are thus held firmly in their place. These knives are placed on a line parallel to each other, but obliquely to the line of the shaft.

I is an adjustable ledger-blade set upon the line of the shaft C, so that the action of the knives in concert with the ledger-blade is similar to the action of a pair of shears.

J is a screw by which the ledger-blade is held in place and adjusted.

K K K are pinions of different diameters, and so arranged upon the shaft C as to be run independent of each other.

L is a compound spur-wheel upon the shaft of one of the feeding-rollers, the cogs of which mesh into the pinion-wheels K K K.

M M are metallic fluted feeding-rollers.

N is a sliding bolt working in a hollow in the shaft C. This shaft, upon the part covered by the pinions K, has a slot cut through to the end, in which the bolt N slides.

From near the inner end of this bolt is a pin or spur, O, projecting through the slot in the shaft, into a groove cut in each of the pinions.

If a slow feed is desired, draw out the bolt N till the spur O is in the groove of the smallest pinion K, which is thus made fast to the shaft C, and is the only one communicating power to the spur-wheel, and meshes into that part having the largest diameter, and consequently gives the slowest motion.

Should a faster motion be desired, push the bolt in till the spur is in the groove of the middle pinion, which meshes into the second set of cogs in the spur-wheel, whose diameter is less than the first, and the speed consequently increased.

Should a still greater speed be desired, push the bolt in till the spur is in the largest pinion, which will then communicate the power to that part of the wheel having the smallest diameter, and consequently the speed of the feeding-rollers will be the greatest.

When the spur O is in one pinion, the other two turn loosely upon the shaft.

Motion is communicated to the lower feeding-roller by means of four pinions, $Q^1$ $Q^2$ $Q^3$ $Q^4$, of which the pinions $Q^1$ and $Q^4$ are fast upon the shafts of the feeding-rollers, and the pinions $Q^2$ and $Q^3$ work loosely upon fixed studs. The power is communicated from $Q^1$, upon the upper feeding-roller, through $Q^2$ and $Q^3$, to $Q^4$, on the lower feeding-roller.

The journals upon which the lower feeding-roller runs are placed in a circular slot, R, the center of the circle being the same as the center of pinion $Q^3$, and the radius just double that; consequently, as the roller is pressed apart from the opposite roller by a large amount of fodder passing between them, the same relative distance between pinions $Q^3$ and $Q^4$ is maintained, and the possibility avoided of their being thrown out of gear.

The journals R are kept pressed up in their proper place by the lever S, acted upon by the movable weight T, whereby a pressure is kept upon the movable feeding-roller.

U is an iron hook fastened at the top to the frame

A, the hook at its lower end being the fulcrum of the lever S.

V are uprights, upon which rest the journals R.

W is a frame-work attached to the frame A on each side, which supports the cutting and feeding apparatus.

X is a handle for operating the machine by hand.

Y is a cover to the cutting-knives.

Instead of the separate independently-operating pinions K, on the driving-shaft C, with a sliding or shifting locking-bolt N, to lock the pinion required to be used, a sliding double pinion may be used in place thereof, especially where a limited amount of changes of feed is required, which is shown in fig. 6, in which C is the driving-shaft; P a sliding double pinion, having two sets of cogs, *a a'*, which are of different diameters, and which correspond with the two sets of cogs on the spur-wheel L, which are also of different diameters.

*c* is a rib on the shaft C, which causes the pinions P to turn with the shaft.

The pinions P may be locked in the position required by passing a pin into suitable holes in the shaft, but other means may be used for holding the pinions in the required position on the shaft. When the pinions P are used, and it is required to cut the fodder short, the cogs *a* of pinion P should gear with the cogs *b* on wheels L, which will turn the shafts of the feeding-rollers at a slow speed, when the fodder will be cut short; but when it is desired to cut the fodder longer, the double pinion P should be moved outward upon the shaft, so as to bring the cogs *a'* into gear with the cogs *b'*, when the feeding-rollers will be turned with increased velocity relatively to the cutting-knives, which will increase the length of the cut fodder.

It is obvious that the arrangement of some of the parts of this machine may be changed and modified without altering the principle of some of the other parts thereof. For instance, the upper feeding-roller may be made the movable one, and the knives made to cut downward, as is the usual manner of fodder-cutting machines, which change would not necessitate a change of the combination of the pinions $Q^1$ $Q^2$ $Q^3$ $Q^4$ for operating the feeding-rollers, the change of gearing being only with the connections between the parts. Also, the lever S may be substituted with a spring or springs to exert a pressure upon the movable feeding-roller; and the driving-handle or means of conveying power to the machine may be connected with another shaft than the knife-shaft. And when the machine is to be used where only a limited amount of changes of feed is required, the sliding gear P would be preferable to the separate pinions K, as being more simple and durable for that purpose.

Having thus described the invention of DAVID J. POWERS,

What is claimed as his invention in the construction of fodder-cutting machines is—

1. The intermediate pinions $Q^2$ and $Q^3$, placed on fixed studs or axes, in combination with the pinions $Q^1$ and $Q^4$ on the feed-roller shafts, arranged substantially as and for the purpose specified.

2. The combination of the independently-operating pinions K K K with the driving or crank-shaft, whereby the speed of the feeding mechanism may be changed, substantially as described.

3. The combination of a double-cog sliding or shifting-gearing with the driving or crank-shaft, whereby the speed of the feeding-mechanism may be changed, substantially as described.

4. The combination of the shifting operating gears K K K or P with the spur-gear L, pinions $Q^1$ $Q^2$ $Q^3$ $Q^4$, and feeding-rollers M M, all to operate so as to vary the speed of the feeding-rollers according to the length of cut required, substantially as shown and described.

JAMES PALMER.

Witnesses:
GEO. T. PALMER,
CHAS. E. FROST.